US012480092B2

(12) United States Patent
Gao et al.

(10) Patent No.: US 12,480,092 B2
(45) Date of Patent: Nov. 25, 2025

(54) METHOD FOR PREPARING MATURE RED BLOOD CELLS IN VITRO USING PERIPHERAL BLOOD

(71) Applicant: WESTLAKE THERAPEUTICS (HANGZHOU) CO. LIMITED, Hangzhou (CN)

(72) Inventors: Xiaofei Gao, Hangzhou (CN); Yanjie Huang, Hangzhou (CN); Qing Zhang, Hangzhou (CN)

(73) Assignee: WESTLAKE THERAPEUTICS (HANGZHOU) CO. LIMITED, Hangzhou (CN)

(*) Notice: Subject to any disclaimer, the term of this patent is extended or adjusted under 35 U.S.C. 154(b) by 885 days.

(21) Appl. No.: 17/430,020

(22) PCT Filed: Feb. 26, 2020

(86) PCT No.: PCT/CN2020/076820
§ 371 (c)(1),
(2) Date: Aug. 11, 2021

(87) PCT Pub. No.: WO2020/173466
PCT Pub. Date: Sep. 3, 2020

(65) Prior Publication Data
US 2022/0112463 A1  Apr. 14, 2022

(30) Foreign Application Priority Data
Feb. 28, 2019 (CN) .......................... 201910151896.6

(51) Int. Cl.
*C12N 5/078* (2010.01)

(52) U.S. Cl.
CPC ........ *C12N 5/0641* (2013.01); *C12N 2500/24* (2013.01); *C12N 2500/32* (2013.01); *C12N 2501/125* (2013.01); *C12N 2501/14* (2013.01); *C12N 2501/2303* (2013.01); *C12N 2501/2306* (2013.01); *C12N 2501/33* (2013.01); *C12N 2501/727* (2013.01); *C12N 2506/115* (2013.01)

(58) Field of Classification Search
CPC .............. C12N 5/0641; C12N 2500/24; C12N 2500/32; C12N 2501/125; C12N 2501/14; C12N 2501/2303; C12N 2501/2306; C12N 2501/33; C12N 2501/727
See application file for complete search history.

(56) References Cited

U.S. PATENT DOCUMENTS

2014/0255369 A1  9/2014  Turner et al.
2014/0273211 A1  9/2014  Slukvin et al.

FOREIGN PATENT DOCUMENTS

CN  101310007 A    11/2008
CN  103667188 A *  3/2014  ........... C12N 5/0641
(Continued)

OTHER PUBLICATIONS

Gallacher et al., Hematopoiesis (2000) 95(9): 2813-2820 (Year: 2000).*

(Continued)

*Primary Examiner* — Evelyn Y Pyla
*Assistant Examiner* — Katherine R Small
(74) *Attorney, Agent, or Firm* — Hoxie & Associates LLC

(57) ABSTRACT

The present disclosure provides a method for producing red blood cells by using peripheral blood as well as the produced red blood cells.

10 Claims, 13 Drawing Sheets

(56) References Cited

FOREIGN PATENT DOCUMENTS

| | | | |
|---|---|---|---|
| CN | 103667188 B | 2/2016 | |
| CN | 107429230 A | 12/2017 | |
| CN | 107663515 A | 2/2018 | |
| CN | 108398361 A | 8/2018 | |
| CN | 109609533 A | 4/2019 | |
| CN | 109652369 A | 4/2019 | |
| WO | 1999/061584 A1 | 12/1999 | |
| WO | WO 2006/113881 A2 | 10/2006 | |
| WO | WO-2007038664 A1 * | 4/2007 | ......... G01N 33/5014 |
| WO | 2013/023015 A2 | 2/2013 | |
| WO | WO 2016/123100 A1 | 8/2016 | |
| WO | WO 2020/173466 A1 | 9/2020 | |

OTHER PUBLICATIONS

McKee et al., Colloids and Surfaces B: Biointerfaces (2017) 159: 62-77 (Year: 2017).*

Albeniz et al., Oncology Letters (2012) 3: 55-60 (Year: 2012).*

Ando, et al., Experimental Hematology (2000) 28: 690-699 (Year: 2000).*

Guo et al., Stem Cells (2003) 21:15-20 (Year: 2003).*

Van Veen et al., J Tissue Eng Regen Med (2015) 9: 760-770 (Year: 2015).*

Boehm et al., Journal of Biotechnology (2009) 144: 127-134 (Year: 2009).*

Han et al., Stem Cell Research (2018) 64-75 (Year: 2018).*

Verfaillie et al., Experimental Hematology (2000) 28(9): 1071-1079 (Year: 2000).*

Dooley et al., Stem Cells (2004) 22(4): 556-569 (Year: 2004).*

Ren et al., "A Versatile System for Rapid Multiplex Genome-Edited CAR T Cell Generation," *Oncotarget*, vol. 8, No. 10, pp. 17002-17011, (2017).

Written Opinion for International Application No. PCT/CN2020/076820, mailed by the International Bureau on May 28, 2020, 6 pages.

Ronzoni, B., et al. "Erythroid Differentiation and Maturation from Peripheral CD34+ Cells in Liquid Culture: Cellular and Molecular Characterization," Blood Cells Mol Dis, vol. 40, No. 2, pp. 148-155, (2008), Abstract Only.

* cited by examiner

Donor 1

Mature RBCs    Enucleating Cells    Cell nucleus

Donor 2

METHOD FOR PREPARING MATURE RED BLOOD CELLS IN VITRO USING PERIPHERAL BLOOD

FIELD OF THE INVENTION

The present disclosure relates to the field of stem cells and cell regeneration, in particular to a method for preparing mature red blood cells in vitro using peripheral blood.

BACKGROUND

It is well known that blood transfusion is a life-saving means for treating patients with severe ischemia (for example, acute anemia, severe thrombocytopenia, hemophilia), but there are many problems in clinical medicine, mainly including blood shortage and the risk of blood transfusion. The shortage of blood for clinical use has always been a problem in the national and even global medical and health fields. According to research, the amount of blood for medical clinical use has been increasing year by year in a double-digit proportion, and at the same time, the number of qualified blood donors has been decreasing. The successive cancellation of mutual aid blood donation in some areas of China has led to a serious contradiction between supply and demand of blood; and it must not be ignored that there is still a risk of blood-borne disease transmission through allogeneic blood transfusion. In view of the presence of "window period," many new pathogens cannot be detected, which brings a certain degree of blood transfusion risk. In addition, blood transfusion medicine is also facing with antigen/antibody mismatches that cause patients to develop immune resistance and result in the problem of timely blood source supply for patients with rare blood types. The above problems with blood use have triggered concerns about clinical blood use, and how to solve the shortage of blood has become a looming problem.

In order to solve the above problems of blood use, the technology of red blood cell regeneration has developed rapidly. The current red blood cell regeneration methods are mainly based on $CD34^+$ bone marrow hematopoietic stem cells or $CD34^+$ umbilical cord blood hematopoietic stem cells. The extraction of $CD34^+$ bone marrow hematopoietic stem cells will cause great physical pain and harm to cell supplier, while $CD34^+$ umbilical cord blood hematopoietic stem cells can only be obtained during a specific period of time when the newborn is born. Accordingly, the above two methods have great limitations in clinical application.

China Patent Publication No. CN103667188B, titled "[a] method for preparing mature red blood cells," relates to a method for preparing mature red blood cells by in vitro culture using mononuclear cells from umbilical cord blood or peripheral blood. Although the method mentions a method for preparing red blood cells using mononuclear cells from peripheral blood as a starting material, this method still uses $CD34^+$ cells, which are only in a very low proportion in the peripheral blood mononuclear cells. This causes great difficulty in acquisition of sufficient cells, and limits the possibility of large-scale clinical application.

There appears to be discordant results on the differentiation potential of $CD34^-$ hematopoietic stem cells, and the absence of a suitable erythroid differentiation culture system also limits the use of $CD34^-$ hematopoietic stem cells.

Therefore, there is still a need for an improved method for preparing mature red blood cells in vitro.

SUMMARY

In one aspect, the present disclosure provides a method for producing red blood cells (RBCs), which comprises (a) collecting lineage and CD34 negative cells ($Lin^-$ $CD34^-$ cells) from a blood sample, (b) expanding the $Lin^-$ $CD34^-$ cells; and (c) inducing the expanded $Lin^-$ $CD34^-$ cells to differentiate into mature red blood cells.

In some embodiments, the blood sample is a peripheral blood sample, a cord blood sample or a fetal blood sample. In a further embodiment, the blood sample is a human peripheral blood sample.

In some embodiments, step (a) comprises isolating peripheral blood mononuclear cells (PBMCs) from the blood sample and removing lineage positive ($Lin^+$) cells from the PBMCs, e.g., by using a lineage cell depletion kit. In a further embodiment, step (a) further comprises removing CD34 positive ($CD34^+$) cells from the PBMCs.

In some embodiments, the lineage $Lin^+$ can be removed by using suitable antibodies, which may be e.g. anti-human CD3 antibody, anti-human CD14 antibody, anti-human CD16 antibody, anti-human CD19 antibody, anti-human CD41a antibody, anti-human CD56 antibody and anti-human CD235a antibody. In some embodiments, the antibodies can be murine anti-human antibodies, e.g., mouse anti-human antibodies. In some further embodiments, the antibodies may be used in an amount of about 2-6 µg/ml, such as 3, 4, and 5 µg/ml.

In some embodiments, step (b) comprises culturing the $Lin^-$ $CD34^-$ cells in a hematopoietic stem cell expansion medium supplemented with a combination of cytokines. In a further embodiment, the combination of cytokines comprises fms-like tyrosine kinase 3 ligand (Flt3L), stem cell factor (SCF), interleukin 3 (IL-3), and interleukin 6 (IL-6). In a further embodiment, the combination of cytokines comprises about 50-100 ng/mL human Flt3L, about 50-100 ng/mL human SCF, about 50-100 ng/mL human IL-3, and about 200-800 pg/mL human IL-6. In an alternative embodiment, the combination of cytokines comprises about 10-100 ng/mL (e.g., 20, 30, 40, 50, 60, 70, 80 and 90 ng/mL) human Flt3L, about 50-150 ng/mL (e.g., 50, 60, 70, 80, 90, 100, 110, 120, 130 and 140 ng/mL) human SCF, about 1-10 ng/mL (e.g., 1, 2, 3, 4, 5, 6, 7, 8, 9 and 10 ng/mL) human IL-3, and 5-20 ng/mL (e.g., 5, 6, 7, 8, 9, 10, 11, 12, 13, 14 and 15 ng/mL) human IL-6. In some embodiments, recombinant cytokines can be used.

In some embodiments, the hematopoietic stem cell expansion medium is a serum-free expansion medium, such as StemSpan™ SFEM serum-free expansion medium.

In some embodiments, step (b) comprises culturing the $Lin^-$ $CD34^-$ cells at 37° C. under 5% $CO_2$ for about 2-5 days such as 3, 4 or 5 days.

In some embodiments, step (c) comprises (c1) culturing the expanded $Lin^-$ $CD34^-$ cells to induce the same to differentiate into erythroid cells; and (c2) culturing the erythroid cells to induce enucleation.

In some embodiments, step (c1) comprises culturing the expanded $Lin^-$ $CD34^-$ cells in a first differentiation medium supplemented with cytokines related to erythroid development. In a further embodiment, the cytokines related to erythroid development include IL-3 and SCF.

In some embodiments, the first differentiation medium may contain: fetal bovine serum (FBS), human plasma, glutamine, BSA, transferrin, insulin, one or more antibiotics (e.g., penicillin and/or streptomycin), IL-3, EPO, and SCF. In some embodiments, the first differentiation medium may be a medium (such as an Iscove's Modified Dulbecco's Medium (IMDM)) containing: fetal bovine serum (FBS), human plasma, glutamine, BSA, transferrin, insulin, one or more antibiotics (e.g., penicillin and/or streptomycin, such as Penicillin-Streptomycin), IL-3, EPO, and SCF. In a further embodiment, the first differentiation medium may be a medium (such as an Iscove's Modified Dulbecco's Medium (IMDM)) containing: about 5-15% (v/v) (such as about 6, 7, 8, 9, 10, 11, 12, 13, and 14% (v/v)) FBS, about 2-10% (v/v) (such as about 3, 4, 5, 6, 7, 8, 9 and 10% (v/v)) human plasma, about 1-4 mM (such as 2 and 3 mM) glutamine, about 5-15 mg/ml (such as about 5, 6, 7, 8, 9, 10, 11, 12, 13, 14 and 15 mg/ml) BSA, about 300-600 µg/mL (such as 400, 500 and 600 µg/mL) human transferrin, about 8-13 µg/mL (such as 9, 10, 11 and 12 µg/mL) human insulin, an effective amount of one or more antibiotics (e.g., penicillin and/or streptomycin, such as Penicillin-Streptomycin) (e.g., a combination of about 80-120 U/ml penicillin and about 80-120 µg/ml streptomycin, such as a combination of about 100 U/ml penicillin and about 100 µg/ml streptomycin), about 3-7 ng/mL (such as 4, 5 and 6 ng/mL) human IL-3, about 4-7 U/mL (e.g., 4, 5, 6 and 7 U/mL) human EPO, and about 80-120 ng/mL (e.g., 90, 100 and 110 ng/mL) human SCF. In one embodiment, recombinant human cytokines are used.

In some embodiments, step (c1) comprises culturing the expanded Lin⁻ CD34⁻ cells at 37° C. under 5% $CO_2$ for about 7-11 days such as 8, 9 or 10 days.

In some embodiments, step (c2) comprises culturing the erythroid cells in a second differentiation medium which lacks the cytokines related to erythroid development as compared to the first differentiation medium.

In some embodiments, the second differentiation medium may contain FBS, human plasma, glutamine, BSA, transferrin, insulin, one or more antibiotics (e.g., penicillin and/or streptomycin), and EPO. In some embodiments, the second differentiation medium is a medium (such as an Iscove's Modified Dulbecco's Medium (IMDM)) containing: FBS, human plasma, glutamine, BSA, transferrin, insulin, one or more antibiotics (e.g., penicillin and/or streptomycin), and EPO. In a further embodiment, the second differentiation medium is a medium (such as an Iscove's Modified Dulbecco's Medium (IMDM)) containing: about 5-15% (v/v) (such as about 6, 7, 8, 9, 10, 11, 12, 13, and 14% (v/v)) FBS, about 2-10% (v/v) (such as about 3, 4, 5, 6, 7, 8, 9 and 10% (v/v)) human plasma, about 1-4 mM (such as 2 and 3 mM) glutamine, about 5-15 mg/ml (such as about 5, 6, 7, 8, 9, 10, 11, 12, 13, 14 and 15 mg/ml) BSA, about 300-600 µg/mL (such as 400, 500 and 600 µg/mL) human transferrin, about 8-13 µg/mL (such as 9, 10, 11 and 12 µg/mL) human insulin, an effective amount of one or more antibiotics (e.g., penicillin and/or streptomycin, such as Penicillin-Streptomycin) (e.g., a combination of about 80-120 U/ml penicillin and about 80-120 µg/ml streptomycin, such as a combination of about 100 U/ml penicillin and about 100 µg/ml streptomycin), and about 1-5 U/mL (e.g., 2, 3 and 4 U/mL) human EPO. In one embodiment, recombinant human cytokines are used.

In some embodiments, step (c2) comprises culturing the erythroid cells at 37° C. under 5% $CO_2$ for about 7-10 days such as 7, 8, 9 or 10 days.

In another aspect, the present disclosure provides red blood cells produced by a method of preparing mature red blood cells of the present disclosure.

In another aspect, the present disclosure provides a cytokine composition comprising a recombinant human fms-like tyrosine kinase 3 ligand (Flt3L), a recombinant human stem cell factor (SCF), a recombinant human interleukin 3 (IL-3), and a recombinant human interleukin 6 (IL-6). In one embodiment, the present disclosure provides the cytokine composition for use in enriching or expanding Lin⁻ CD34⁻ cells from peripheral blood mononuclear cells. In a further embodiment, the cytokine composition may comprise 50-100 ng/ml recombinant human fms-like tyrosine kinase 3 ligand (Flt3L), 50-100 ng/ml recombinant human stem cell factor (SCF), 50-100 ng/ml recombinant human interleukin 3 (IL-3), and 200-800 pg/ml recombinant human interleukin 6 (IL-6).

In another aspect, the present disclosure provides the use of a cytokine composition for enriching or expanding Lin⁻ CD34⁻ cells from peripheral blood mononuclear cells. In one embodiment, the cytokine composition comprises a recombinant human fms-like tyrosine kinase 3 ligand (Flt3L), a recombinant human stem cell factor (SCF), a recombinant human interleukin 3 (IL-3), and a recombinant human interleukin 6 (IL-6).

In another aspect, the present disclosure provides the use of a differentiation medium for preparing mature red blood cells from Lin⁻ CD34⁻ cells. In some embodiments, the differentiation medium includes a first differentiation medium of the present disclosure and a second differentiation medium of the present disclosure. In one embodiment, the present disclosure provides a differentiation stage medium for inducing erythroid differentiation, comprising Iscove's Modified Dulbecco's Medium, 10-15% FBS, 5-10% human plasma, 1-4 mM glutamine, 1-2% BSA, 300-600 µg/mL human transferrin, 8-13 µg/mL recombinant human insulin, 1-3% such as 2% recombinant Penicillin-Streptomycin, 3-5 ng/mL recombinant human IL-3, 4-7 U/mL recombinant human EPO, and 100 ng/mL recombinant human SCF.

In another aspect, the present disclosure provides a method for preparing mature red blood cells in vitro using peripheral blood, comprising the following steps:

Step S1: collecting Lin⁻ CD34⁻ cells from peripheral blood;

Step S2: expanding the Lin⁻ CD34⁻ cells;

Step S3: inducing the Lin⁻ CD34⁻ cells to differentiate into erythroid cells and expanding the same; and Step S4: obtaining mature red blood cells by enucleation.

In some embodiments, the step 51 may further comprise resuspending the cells in a cell isolation buffer supplemented with bovine serum albumin and EDTA in a phosphate buffer solution; adding biotin-labeled antibodies and streptavidin-labeled magnetic beads; removing cells with specific surface markers under magnetic force; and collecting the Lin⁻ CD34⁻ cells.

In some embodiments, the step S2 may further comprise on Days 0-5, inoculating the collected Lin⁻ CD34⁻ cells in a hematopoietic stem cell expansion medium, adding a cytokine combination and penicillin-streptomycin, to expand or enrich the Lin⁻ CD34⁻ cells.

In some embodiments, the step S3 may further comprise inoculating the cells obtained in step S2 in a first stage differentiation medium that only provides cytokines related to erythroid development, continuing the culture for 9-11 days, inducing the Lin⁻ CD34⁻ cells to differentiate into erythroid lines and expand.

In some embodiments, the step S4 may further comprise inoculating the cells obtained in step S3 in a second stage differentiation medium that lacks partial cytokines as compared to the first stage differentiation medium, and continuing the culture for 7-9 days to promote the enucleation and maturation of red blood cells.

In some embodiments, the combination of cytokines may include, but not limited to, 50-100 ng/ml recombinant human fms-like tyrosine kinase 3 ligand (Flt3L), 50-100 ng/ml recombinant human stem cell factor (SCF), 50-100 ng/ml recombinant human interleukin 3 (IL-3), and 200-800 pg/ml recombinant human interleukin 6 (IL-6).

In some embodiments, the biotin-labeled antibodies may include, but not limited to, biotin-labeled mouse anti-human CD3 antibody, biotin-labeled mouse anti-human CD14 antibody, biotin-labeled mouse anti-human CD16 antibody, biotin-labeled mouse anti-human CD19 antibody, biotin-labeled mouse anti-human CD41a antibody, biotin-labeled mouse anti-human CD56 antibody and biotin-labeled mouse anti-human CD235a antibody.

In some embodiments, the first stage differentiation medium may comprise an Iscove's Modified Dulbecco's Medium, 10-15% FBS, 5-10% human plasma, 1-4 mM glutamine, 1-2% BSA, 300-600 µg/mL human transferrin, 8-13 µg/mL recombinant human insulin, 1-3% such as 2% recombinant Penicillin-Streptomycin, 3-5 ng/mL recombinant human IL-3, 4-7 U/mL recombinant human EPO, and 100 ng/mL recombinant human SCF.

In some embodiments, the second stage differentiation medium may comprise an Iscove's Modified Dulbecco's Medium, 10-15% FBS, 5-10% human plasma, 1-4 mM glutamine, 1-2% BSA, 300-600 µg/mL human transferrin, 8-13 µg/mL recombinant human insulin, 1-3% such as 2% recombinant Penicillin-Streptomycin and 1-5 U/mL recombinant human EPO.

BRIEF DESCRIPTION OF THE DRAWINGS

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

Figure 1:
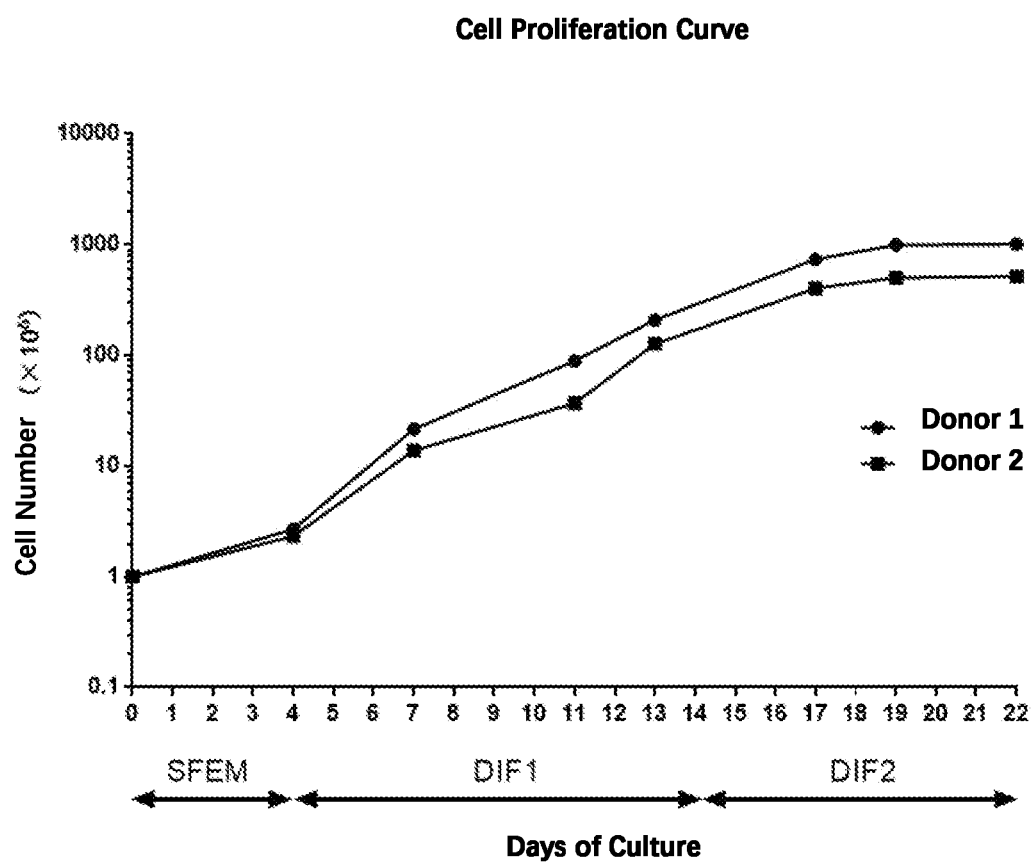
FIG. 1 shows the cell proliferation curve of mature red blood cells prepared in vitro by using peripheral blood according to an embodiment of the present disclosure. The data from two donors are used as a comparison.
Figure 2:
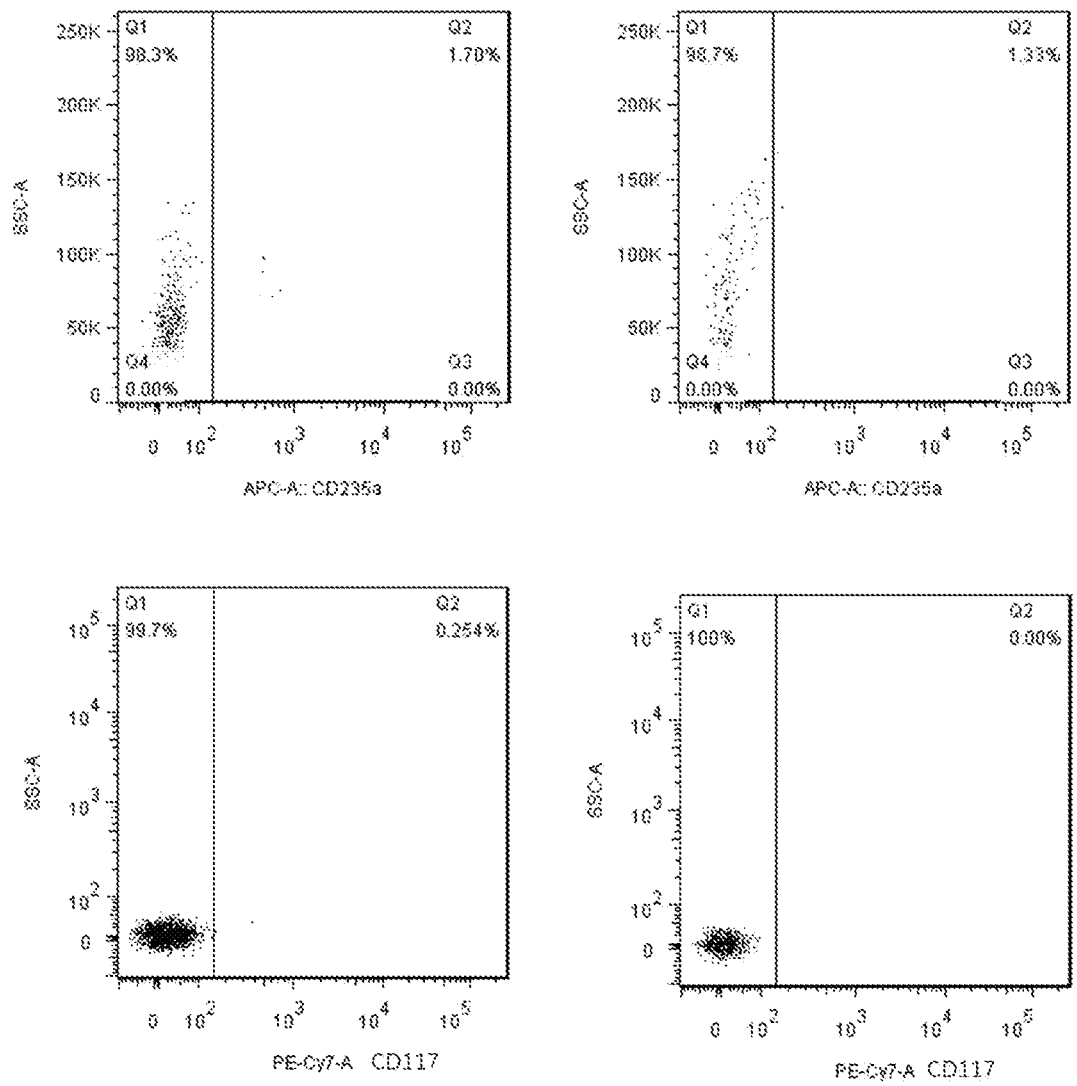
FIGS. 2 and 3 show CD235a and CD117 expression levels at the stage of the expansion of Lin$^-$ CD34$^-$ cells from two donors and identification of erythrocyte enucleation levels after CD71 and hoechst33342/CD235a co-staining.
Figure 3:
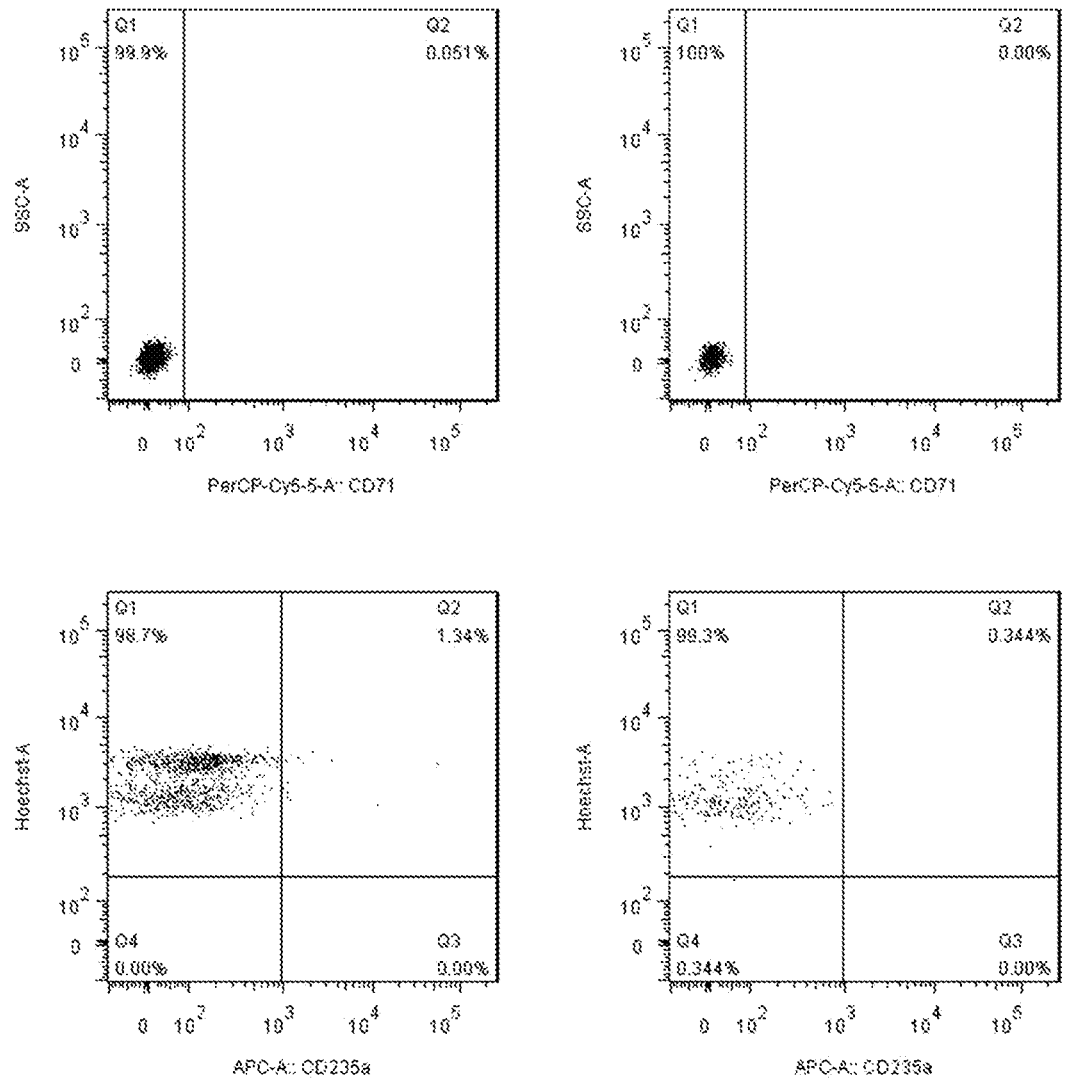
Figure 4:
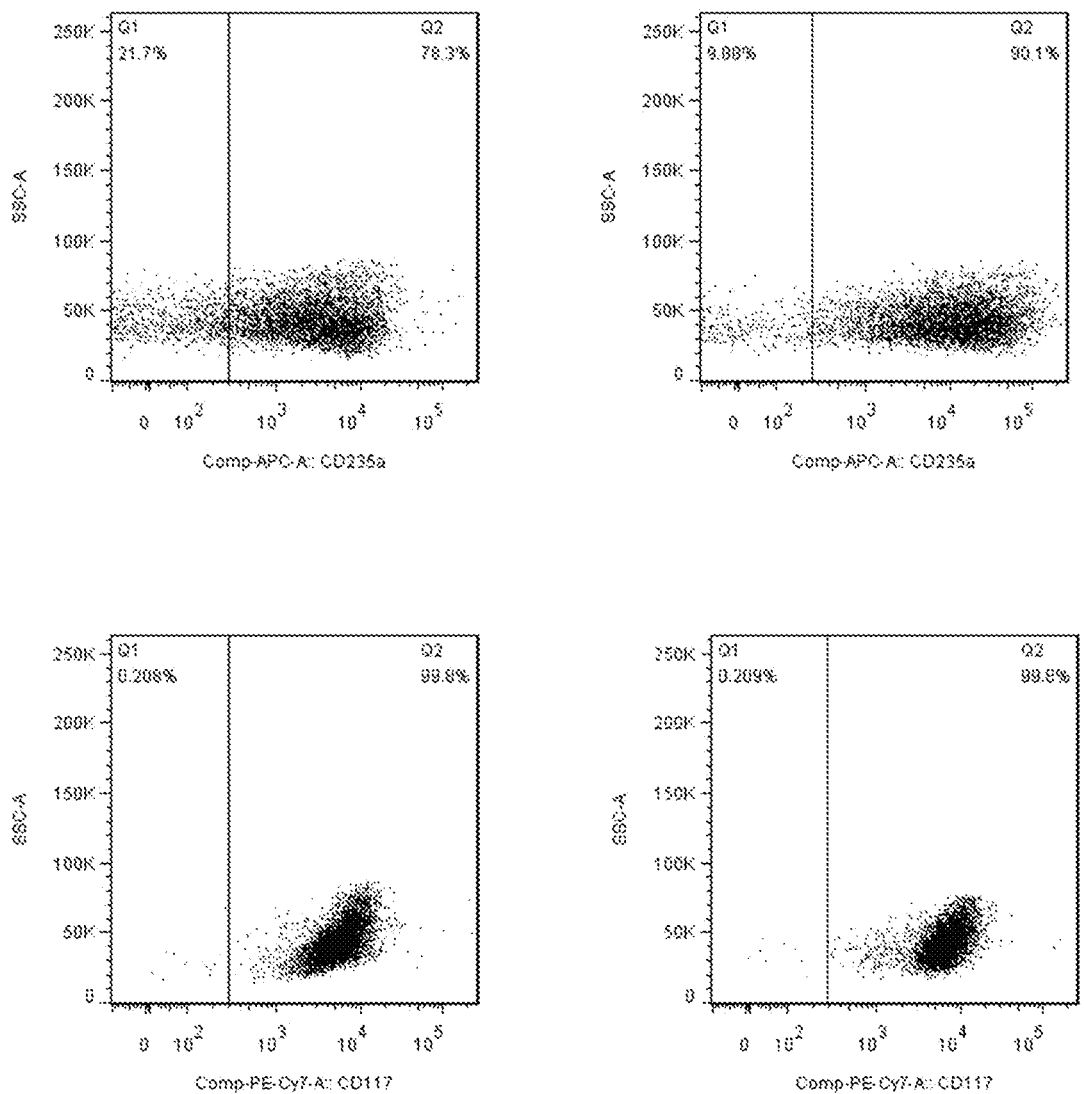
FIGS. 4 and 5 CD235a and CD117 expression levels at the stage of the differentiation of Lin$^-$ CD34$^-$ cells from two donors and identification of erythrocyte enucleation levels after CD71 and hoechst33342/CD235a co-staining.
Figure 5:
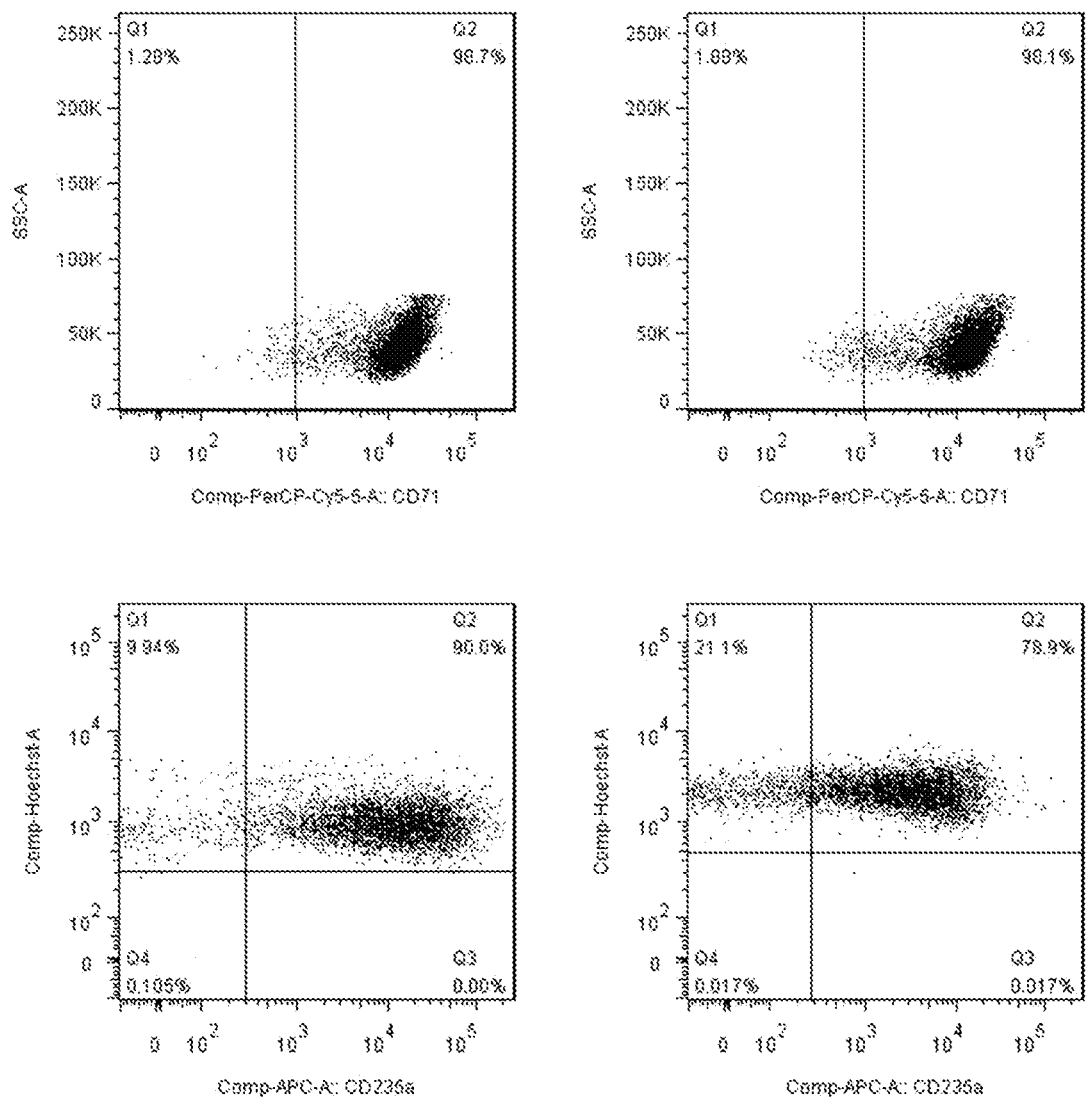
Figure 6:
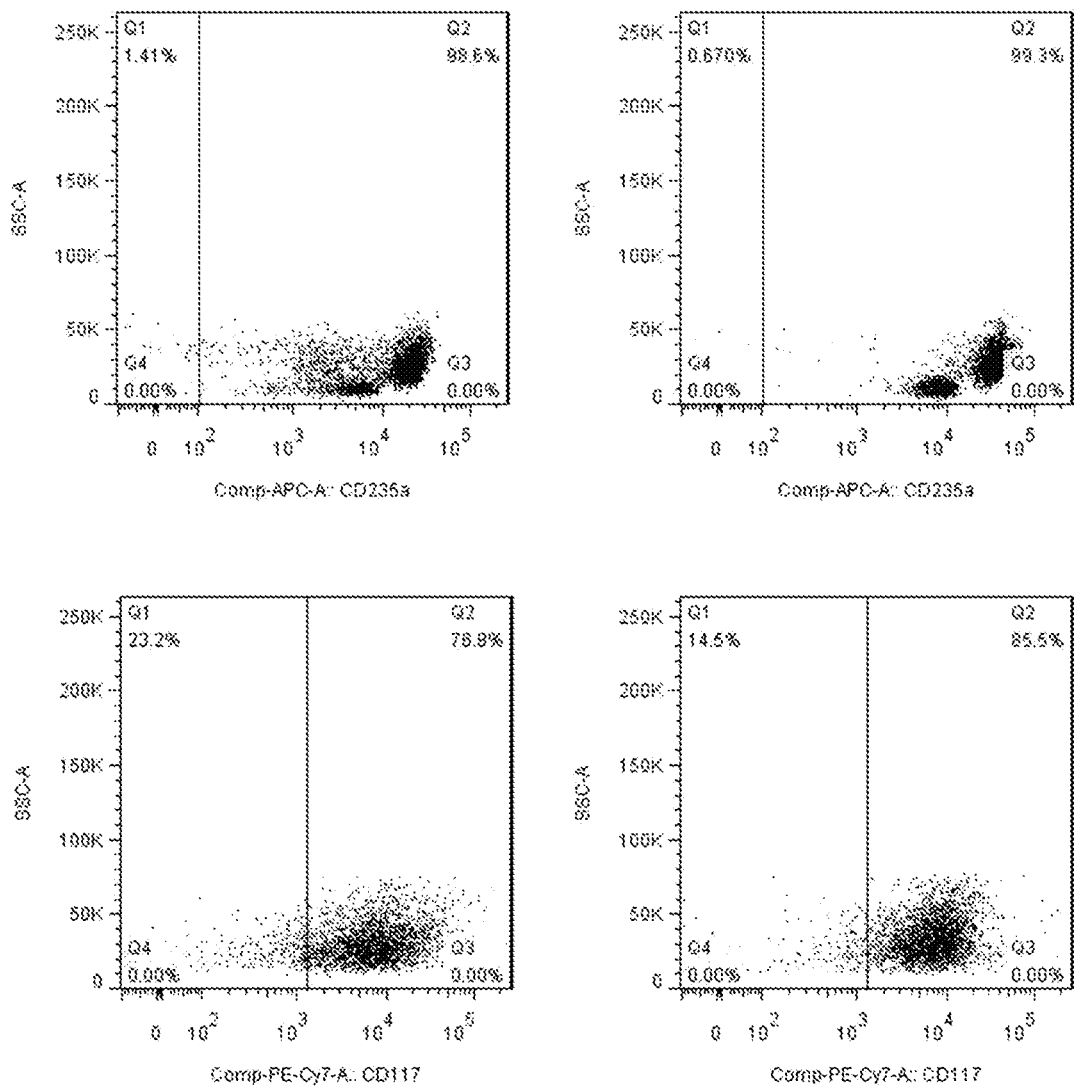
FIGS. 6 and 7 CD235a and CD117 expression levels at the stage of enucleation of Lin$^-$ CD34$^-$ cells from two donors and identification of erythrocyte enucleation levels after CD71 and hoechst33342/CD235a co-staining.
Figure 7:
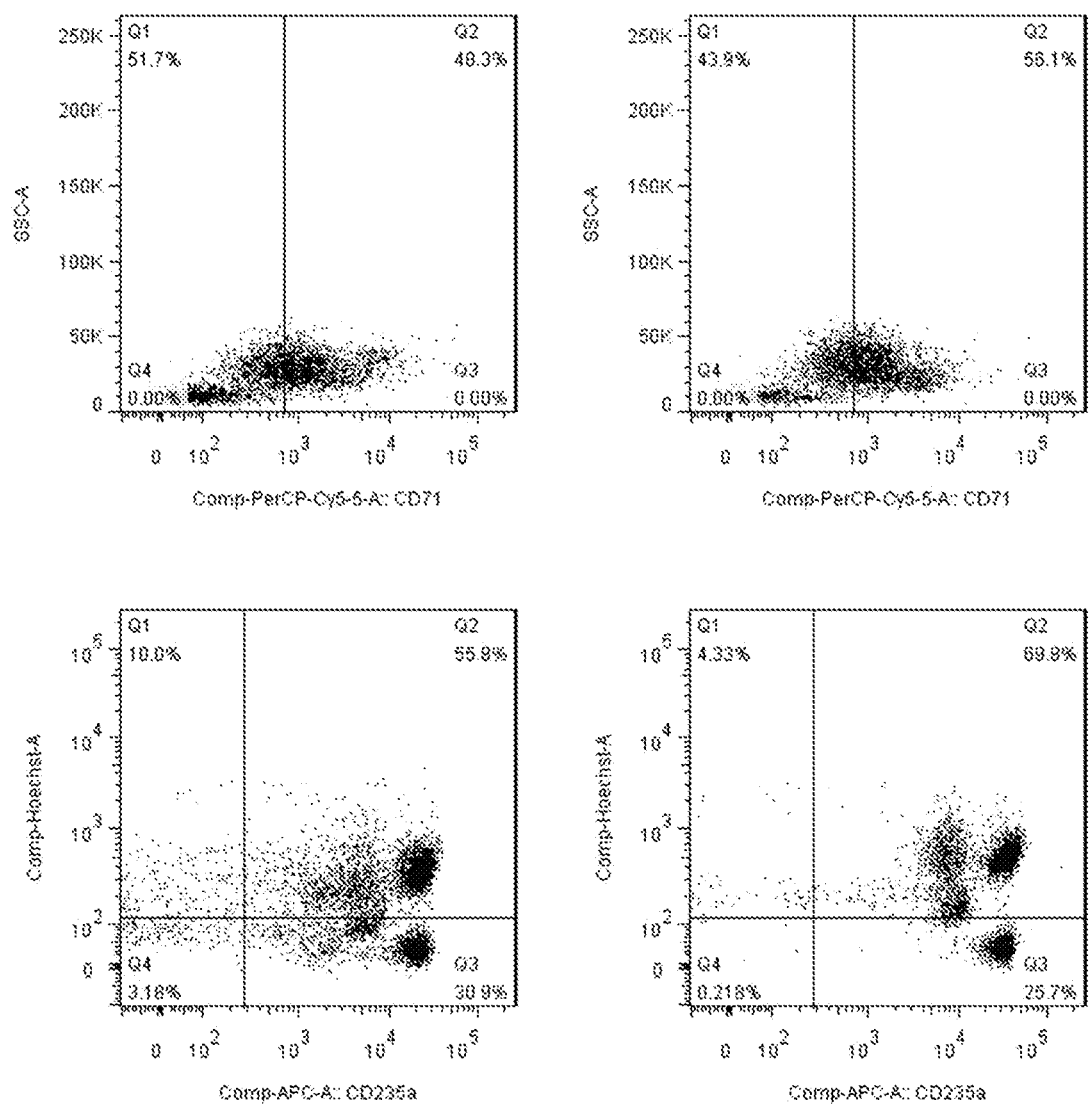
Figure 8:
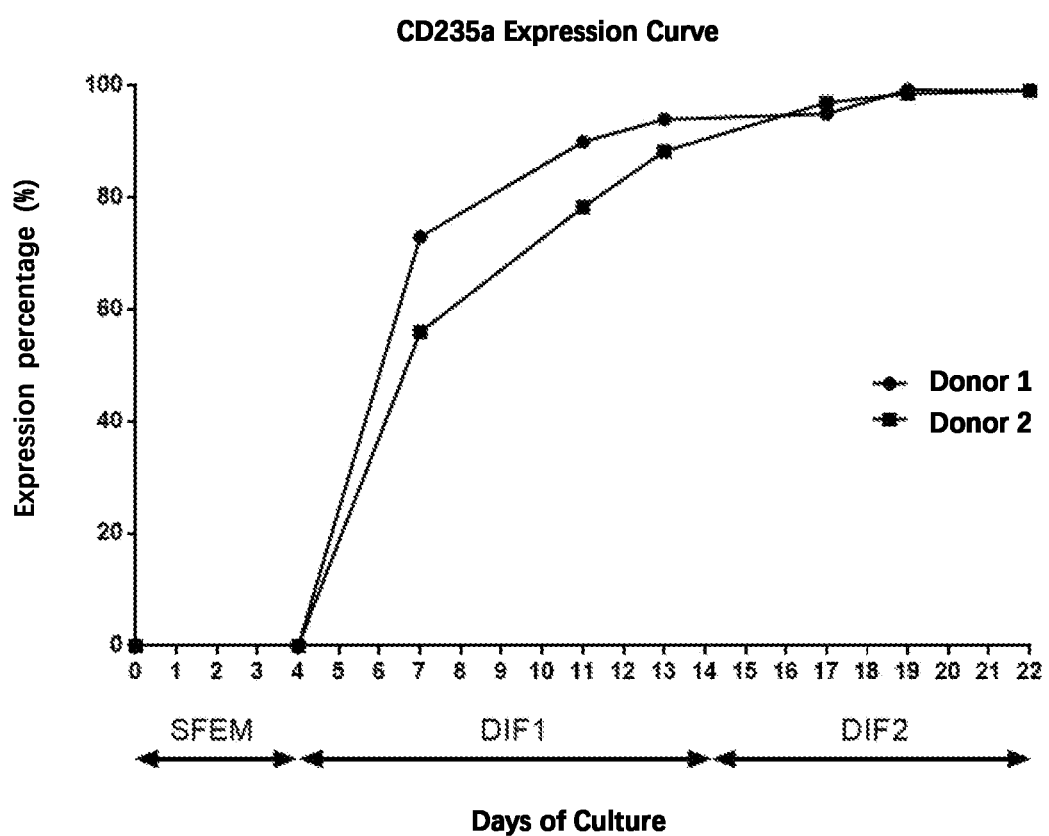
FIG. 8 shows the change curve of CD235a expression at the differentiation culture stage.
Figure 9:
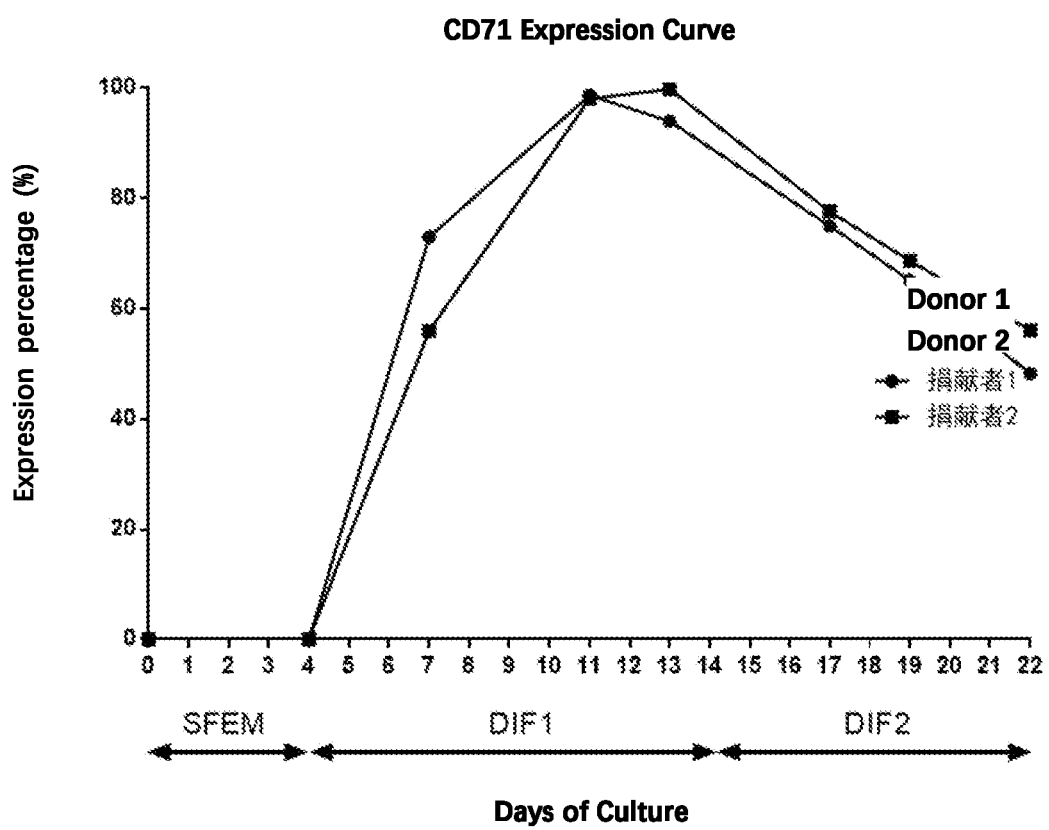
FIG. 9 shows the change curve of CD71 expression at the differentiation culture stage.
Figure 10:
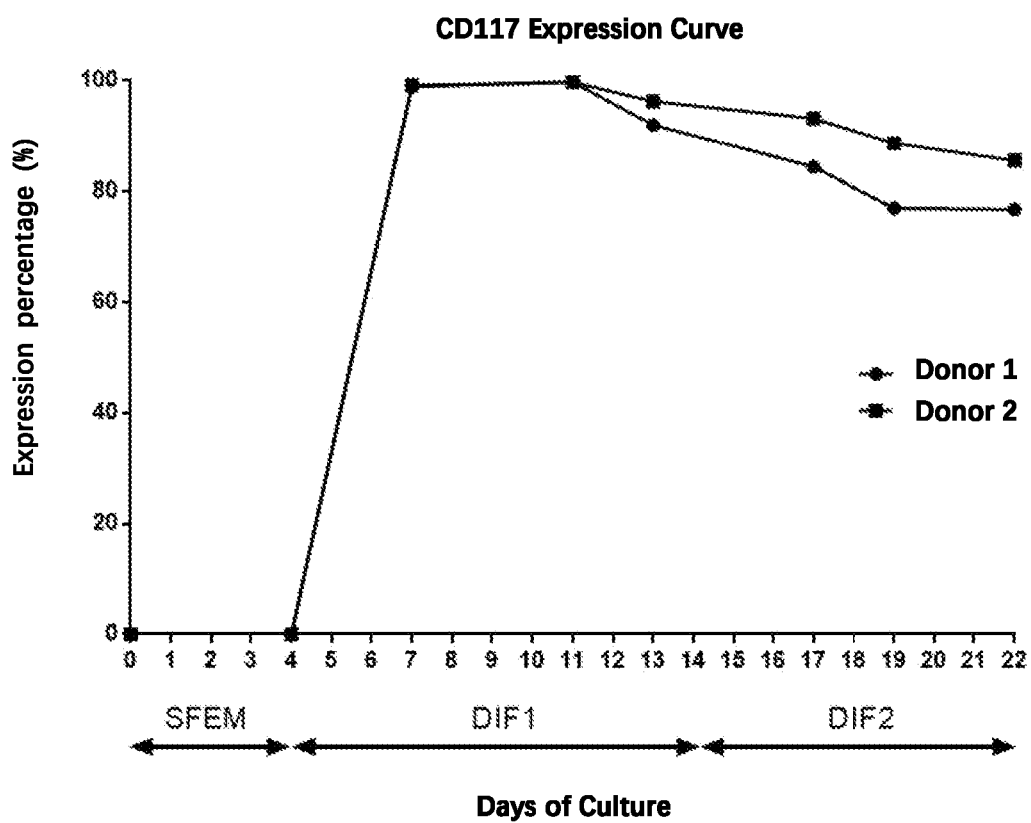
FIG. 10 shows the change curve of CD117 expression at the differentiation culture stage.

For the purposes of understanding of the present disclosure, reference will now be made to the embodiments illustrated in the drawings, and specific language will be used to describe the same. It will nevertheless be understood that no limitation of the scope of this disclosure is thereby intended.

In the present disclosure, unless otherwise specified, the scientific and technical terms used herein have the meanings as generally understood by a person skilled in the art. Although any methods and materials similar or equivalent to those described herein find use in the practice of the present disclosure, the preferred methods and materials are described herein. Accordingly, the terms defined herein are more fully described by reference to the Specification as a whole.

As used herein, the singular terms "a," "an," and "the" include the plural reference unless the context clearly indicates otherwise.

Unless the context requires otherwise, the terms "comprise," "comprises" and "comprising," or similar terms are intended to mean a non-exclusive inclusion, such that a recited list of elements or features does not include those stated or listed elements solely, but may include other elements or features that are not listed or stated.

The term "culturing" as used herein refers to maintaining cells in a medium with or without cell expansion or differentiation for any period of time.

The term "differentiation" as used herein refers to a process by which a less specialized cell such as a stem cell develops or matures to possess a more distinct form and function with a concomitant loss of potential. Cells that are less specialized can be differentiated into cells that are more specialized by culturing the cells under particular conditions or in specific media as known in the art.

The term "peripheral blood mononuclear cells" or "PBMCs" as used herein refers to cells with a single nucleus in peripheral blood, including various lymphocyte and monocyte. One useful method for isolation of peripheral blood mononuclear cells is Ficoll-Hypaque density gradient centrifugation.

The term "lineage negative cells" or "Lin$^-$ cells" as used herein refers to cells that are essentially free of lineage markers. Lineage markers are characteristic of cell lineages. Exemplary lineage markers are CD3, CD14, CD16, CD19, CD41a, CD56, and D235a. In fact, lineage negative cells are essentially not stained by the lineage antibodies. Lineage negative cells comprise stem and progenitor cells. Accordingly, lineage negative cells also show stem and progenitor cell activity. Lin negative cells or a blood cell population enriched for lineage negative cells can be purified by enriching a blood cell population that is essentially free of lineage markers. For example, the lineage negative cells can be purified by depleting cells that are positive for at least one lineage marker selected from the group consisting of CD3, CD14, CD16, CD19, CD41a, CD56 and CD235a. In some embodiments, a lineage cell depletion kit can be used to perform the purification. To the contrary, lineage positive (Lin$^+$) cells are a mix of all cells expressing mature cell lineage markers. Examples of lineage positive cells include T cells, B cells, NK cells, dendritic cells, monocytes, granulocytes, erythroid cells, and their committed precursors.

The term "Lin$^-$ CD34$^-$ cells" as used herein refers to cells that have not entered various hematopoietic lineages, and do not express lineage and CD34 surface markers.

The term "biotin-labeled antibody" as used herein refers to an antibody with biotin attached to. Biotin-labeling reaction is simple and mild and rarely inhibits antibody activity. Covalently binding biotin to an antibody is a very simple and direct labeling means.

The term "hematopoietic stem cell expansion medium" as used herein refers to a serum-free medium with addition of hematopoietic growth factors and/or other stimulators selected by users, in order to promote the expansion of hematopoietic stem/progenitor cells (HSPC) or their differentiation into specific lineages. One useful hematopoietic stem cell expansion medium may be StemSpan™ SFEM serum-free expansion medium.

The term "fms-like tyrosine kinase 3 ligand" or "Flt3L" as used herein, also known as FL, Flt3L and FLT3LG, refers to an alpha-helix cytokine that promotes the differentiation of a plurality of hematopoietic cell lineages. FLT3LG is structurally homologous to stem cell factor (SCF) and colony-stimulating factor 1 (CSF-1). FLT3LG, as a growth factor, increases the number of cells by activating hematopoietic progenitor cells. In one embodiment, Flt3L may be recombinant human fms-like tyrosine kinase 3 ligand (rhFlt3L).

The term "stem cell factor" or "SCF" as used herein, also known as Kit ligand (KITLG), refers to a type I transmembrane glycoprotein of the SCF family. SCF is a ligand for receptor protein tyrosine kinase KIT, and plays an important role in regulating cell survival and proliferation, hematopoiesis, stem cell maintenance, cell development, migration and function. In one embodiment, SCF may be recombinant human stem cell factor (rhSCF).

The term "interleukin 3" or "IL-3" as used herein refers to a glycoprotein belonging to the hematopoietic growth factor family, which has shown multi-lineage activity in preclinical in vitro and in vivo studies. Hematopoietic progenitor cells, with the help of IL-3 protein, proliferate and differentiate into mature red blood cells, mast cells, megakaryocytes and granulocytes. In one embodiment, IL-3 may be recombinant human interleukin 3 (rhIL-3).

The term "interleukin 6" or "IL-6" as used herein refers to a multi-functional cytokine that regulates immune response, hematopoietic function, acute phase response and inflammatory response. It works with IL-3 to promote the proliferation of hematopoietic cells. In one embodiment, IL-6 may be recombinant human interleukin 6 (rhIL-6).

The term "erythropoietin" or "EPO" as used herein refers to a main erythropoiesis factor, which interacts synergistically with various other growth factors (e.g., IL-3, IL-6, glucocorticoids, and SCF) for the development of erythroid lineages from pluripotent progenitor cells. Burst-forming unit-erythroid (BFU-E) cells begin to express erythropoietin receptor and are sensitive to erythropoietin. EPO is an important erythropoietic cytokine. In one embodiment, EPO may be recombinant human erythropoietin (rhEPO).

The term "transferrin" or "holo transferrin" as used herein refers to a main ferritin in plasma and can form a complex with iron ions for the production of hemoglobin in red blood cells. In one embodiment, transferrin may be human transferrin (human holo transferrin).

One objective of the present disclosure is to provide a method for preparing mature red blood cells in vitro using peripheral blood, and more specifically, a method for in vitro culture of a large number of red blood cells using a small amount of Lin⁻ CD34⁻ cells in peripheral blood, and to establish a stable erythroid differentiation culture system and condition to solve the problem of red blood cell differentiation in vitro.

The first aspect of the present disclosure provides a method for preparing mature red blood cells in vitro using peripheral blood. The method comprises isolating mononuclear cells from peripheral blood to separate mononuclear cells from other cells such as red blood cells and platelets, collecting and expanding Lin⁻ CD34⁻ cells in the mononuclear cells, inducing the differentiation of the Lin⁻ CD34⁻ cells into red blood cells and achieving a large number of expansion in the presence of sufficient erythroid cell-related cytokines, and obtaining mature red blood cells by enucleation.

The second aspect of the present disclosure provides a method for preparing mature red blood cells in vitro using peripheral blood, comprising the following steps:
Step S1: collecting Lin⁻ CD34⁻ cells from peripheral blood;
Step S2: expanding the Lin⁻ CD34⁻ cells;
Step S3: inducing the Lin⁻ CD34⁻ cells to differentiate into erythroid cells and expanding the same; and
Step S4: obtaining mature red blood cells by enucleation.

More specifically, the method for preparing mature red blood cells in vitro using peripheral blood may comprise the following steps:
S1. Obtaining peripheral blood and isolating peripheral blood mononuclear cells (PBMCs); centrifuging the mononuclear cells obtained in step S1; resuspending the cells in a cell isolation buffer supplemented with bovine serum albumin and EDTA in a phosphate buffer solution; adding biotin-labeled antibodies; adding streptavidin-labeled magnetic beads; removing cells with specific surface markers under magnetic force; collecting the isolation buffer that is not adsorbed; and centrifuging the buffer to obtain Lin⁻ CD34⁻ cells;
S2. On day 0, collecting the Lin⁻ CD34⁻ cells obtained in step S1, inoculating the collected cells in a hematopoietic stem cell expansion medium, adding a cytokine combination and penicillin-streptomycin, and culturing for 3-5 days to enrich the Lin⁻ CD34⁻ cells;
S3. On days 3-5, collecting the cells obtained in step S2, inoculating the collected cells in a first stage differentiation medium that only provides cytokines related to erythroid development, continuing the culture until days 12-14, inducing the Lin⁻ CD34⁻ cells to differentiate into erythroid lines and achieve large-scale expansion;
S4. On days 13-15, collecting the cells obtained in step S3, inoculating the collected cells in a second stage differentiation medium that lacks partial cytokines as compared to the first stage differentiation medium, and continuing the culture until days 21-23 to promote the enucleation and maturation of red blood cells.

According to the method of the second aspect of the present disclosure, in step S1, the mononuclear cells are separated by using whole blood from peripheral blood. The separation process incudes using a phosphate buffer solution to dilute the whole blood at a rate of 1:1, an then using a lymphocyte separation solution (Lymphoprep™, STEMCELL Technologies) and a lymphocyte separation tube to centrifuge the whole blood at 1200×g for 15 minutes to obtain peripheral blood mononuclear cells. In this step, the density gradient centrifugation of cell components is achieved by a lymphocyte separation solution. The peripheral blood mononuclear cells are initially separated from other different cells such as red blood cells and platelets to ensure the subsequent enrichment/expansion of the Lin⁻ CD34⁻ cells.

According to the method of the second aspect of the present disclosure, in step S1, the biotin-labeled antibodies may include 2-50 μg/ml such as 20-40 μg/ml biotin-labeled mouse anti-human CD3 antibody (Biotin Mouse Anti-human CD3), 2-50 μg/ml 20-40 μg/ml biotin-labeled mouse anti-human CD14 antibody (Biotin Mouse Anti-human CD14), 2-50 μg/ml 20-40 μg/ml biotin-labeled mouse anti-human CD16 antibody (Biotin Mouse Anti-human CD16), 2-50 μg/ml 20-40 μg/ml biotin-labeled mouse anti-human CD19 antibody (Biotin Mouse Anti-human CD19), 2-50 μg/ml 20-40 μg/ml biotin-labeled mouse anti-human CD41a antibody (Biotin Mouse Anti-human CD41a), 2-50 μg/ml 20-40 μg/ml biotin-labeled mouse anti-human CD56 antibody (Mouse Anti-human CD56) and 2-50 μg/ml 20-40 μg/ml biotin-labeled mouse anti-human CD235a antibody (Biotin Mouse Anti-human CD235a), wherein the biotin-labeled mouse anti-human CD3 antibody is used to isolate and enrich T cells, the biotin-labeled mouse anti-human CD14 antibody is used to isolate and enrich monocytes, macrophages and dendritic cells, the biotin-labeled mouse anti-human CD16 antibody is used to isolate and enrich natural killer cells, the biotin-labeled mouse anti-human CD19 antibody is used to isolate and enrich B cells, the biotin-labeled mouse anti-human CD41a antibody is used to isolate and enrich megakaryocytes and platelets, the biotin-labeled mouse anti-human CD56 antibody is used to isolate and enrich natural killer T cells, and the biotin-labeled mouse anti-human CD235a antibody is used to isolate and enrich erythroid cells.

The step S1 may further comprising the following steps:
S11: After centrifuging the mononuclear cells at 300×g for 10 minutes, the supernatant is removed, and the cells are resuspended in a cell isolation buffer added with 2% bovine serum albumin and 1 mM EDTA in a phosphate buffer solution; the cells are resuspended at $0.5\text{-}2\times10^6$ cells/ml to obtain a cell suspension;
S12: The biotin-labeled antibodies are diluted with the cell isolation buffer at a volume 10 times that of the cell suspension; the diluted biotin-labeled antibodies and the cell suspension are mixed, and then streptavidin-labeled magnetic beads are added and incubated at 4° C. for 30 minutes; and
S13: The solution obtained in step S12 is then placed in a magnetic rack for 6-8 minutes to separate lineage cells; the isolation buffer that is not adsorbed is collected and centrifuged at 300×g for 10 minutes to obtain Lin$^-$ CD34$^-$ cells.

The principle used in step S1 is that antigens on cell surfaces will be bound to the corresponding biotin-labeled antibodies and then bound to the streptavidin-labeled magnetic beads through biotin, and the cells with specific surface markers expressed after lineage differentiation can be separated and removed by magnetic force, thereby obtaining the Lin$^-$ CD34$^-$ cells without lineage-specific surface markers that have not been separated by magnetic beads.

According to the method of the second aspect of the present disclosure, in the step S2, the cytokine combination may include but is not limited to, 50-100 ng/ml recombinant human fms-like tyrosine kinase 3 ligand (Flt3L), 50-100 ng/ml recombinant human stem cell factor (SCF), 50-100 ng/ml recombinant human interleukin 3 (IL-3), and 200-800 pg/ml recombinant human interleukin 6 (IL-6); and the hematopoietic stem cell expansion medium may be StemSpan™ SFEM serum-free expansion medium, which can be used to expand the Lin$^-$ CD34$^-$ cells after by adding the cytokine combination to obtain more Lin$^-$ CD34$^-$ cells.

In step S2, the expansion culture condition may be at 37° C. and 5% $CO_2$.

According to the method of the second aspect of the present disclosure, in the step S3, the first stage differentiation medium may comprise IMDM (Iscove's Modified Dulbecco's Medium, Sigma-Aldrich), fetal bovine serum (FBS, Gibco), and human plasma, Glutamine, bovine serum albumin (BSA, Albumin from bovine serum), human transferrin (e.g., human holo transferrin, Sigma-Aldrich), recombinant human insulin (Sigma-Aldrich), Penicillin-Streptomycin (Gibco), recombinant human interleukin 3 (rhIL-3, Pepro-tech), recombinant human erythropoietin (rhEPO, Amgen), and recombinant human stem cell factor (rhSCF, Peprotech). In this medium, only cytokines related to erythroid development are provided to ensure the proliferation and differentiation of the Lin$^-$ CD34$^-$ cells into erythroid cells.

In one embodiment, in the first stage differentiation medium, fetal bovine serum may be in an amount of 10-15%, such as 11%, 12%, 13%, and 14%; human plasma may be in an amount of 5-10%, such as 6%, 7%, 8%, and 9%; glutamine may be in an amount of 1-4 mM, such as 2 or 3 mM; bovine serum albumin may be in an amount of 1-2%; human transferrin may be in an amount of 300-600 μg/ml, such as 400 or 500 μg/ml; recombinant human insulin may be in an amount of 8-13 μg/ml, such as 9, 10, 11, 12 μg/ml; the proportion of Penicillin-Streptomycin may be 1-3% such as 2%; recombinant human interleukin 3 may be in an amount of 3-5 ng/ml, such as 4 ng/ml; recombinant human erythropoietin may be in an amount of 4-7 U/ml, such as 5 or 6 U/ml; and recombinant human stem cell factor may be in an amount of 100 ng/ml. In this step, the expansion culture conditions may still be: 37° C., 5% $CO_2$.

According to the method of the second aspect of the present disclosure, in step S4, the second stage differentiation medium may comprise IMDM, fetal bovine serum, human plasma, glutamine, bovine serum albumin, human transferrin, recombinant human insulin, 2% Penicillin-Streptomycin, and recombinant human erythropoietin, wherein the second stage differentiation medium does not include recombinant human interleukin 3 and recombinant human stem cell factor as compared to the first differentiation medium, so as to promote the enucleation and maturation of red blood cells.

In one embodiment, in the second stage differentiation medium, fetal bovine serum may be in an amount of 10-15%, such as 11%, 12%, 13%, and 14%; human plasma may be in an amount of 5-10%, such as 6%, 7%, 8%, and 9%; glutamine may be in an amount of 1-4 mM, such as 2 or 3 mM; bovine serum albumin may be in an amount of 1-2%; human transferrin may be in an amount of 300-600 μg/ml, such as 400 or 500 μg/ml; recombinant human insulin may be in an amount of 8-13 μg/ml, such as 9, 10, 11, 12 μg/ml; the proportion of Penicillin-Streptomycin may be 1-3% such as 2%; and recombinant human erythropoietin may be in an amount of 1-5 U/ml, such as 2, 3 or 4 U/ml. In this step, the expansion culture conditions may still be: 37° C., 5% $CO_2$.

It is worth mentioning that according to the second aspect of the present disclosure, the medium may be changed every 2-4 days during the enucleation phase, and the change of CD235a, CD117, CD71 and Hoechst 33342 expressed by the cells during the culture and differentiation in vitro is measured by flow cytometry.

A third aspect of the present disclosure provides mature red blood cells prepared according to the method of the first or second aspect of the present disclosure.

In one embodiment, the obtained mature red blood cells may have the following parameters: a cell size of 6-8 microns, a hemoglobin content of 30±5 pg for each cell. In a more particular embodiment, adult hemoglobin content may be 94.23%, fetal hemoglobin content may be 2.82%, and adult hemoglobin α2 content may be 3.04%.

A fourth aspect of the present disclosure provides the use of Lin$^-$ CD34$^-$ cells from peripheral blood for preparing mature red blood cells.

A fifth aspect of the present disclosure provides a cytokine composition comprising a recombinant human fms-like tyrosine kinase 3 ligand (Flt3L), a recombinant human stem cell factor (SCF), a recombinant human interleukin 3 (IL-3), and a recombinant human interleukin 6 (IL-6).

A sixth aspect of the present disclosure provides the use of a cytokine composition in expanding or enriching Lin$^-$ CD34$^-$ cells from peripheral blood mononuclear cells.

A seventh aspect of the present disclosure provides a differentiation medium and its use for preparing mature red blood cells from Lin$^-$ CD34$^-$ cells, wherein the differentiation medium may include a first stage differentiation medium and a second stage differentiation medium.

The term "CD235a" as used herein, also known as "blood glycoprotein A", refers to a single-pass transmembrane glycoprotein expressed in mature red blood cells and erythroid precursor cells, and is a specific marker protein on the surface of red blood cells. The expression of CD235a indicates that the cells differentiated into erythroid cells. Flow cytometry analysis shows that in the SFEM (serum free expansion medium) stage, cells do not express CD235a, indicating that the cells do not enter erythroid differentiation, and after the culture medium is changed to the first stage differentiation medium, the cytokines in the medium induce the cells to differentiate into erythroid cells, and the cells begin to express CD235a and the proportion of cells with CD235a continues to increase as the differentiation proceeds. After the medium is changed to the second stage differentiation medium, since the cells has completely entered the erythroid line, almost all the cells express CD235a, indicating that almost all the cells are erythroid cells. This cell surface marker indicates that our differentiation system is successful in the induction of in vitro culture of erythroid cells.

The term "CD117" as used herein, also known as "c-kit," refers to a SCF stem cell growth factor receptor expressed on the surfaces of hematopoietic stem cells and other cells. SCF plays an important role in regulating cell survival and proliferation, hematopoiesis, stem cell maintenance, cell development, migration, and function. The change in the expression of the receptor of SCF reflects the change in the ability of cells to use SCF. CD117 is not expressed under the SFEM condition, indicating that Lin$^-$ cells do not use SCF during the culture phase in SFEM. When the cells are cultured in the first stage differentiation medium, the cells enter erythroid differentiation with rapid CD117 expression increase to its peak, at which time SCF may be added to the medium to regulate cell survival and proliferation, hematopoiesis, stem cell maintenance, and cell development. When the cells are cultured in the second stage differentiation medium, the cells enter the stages of enucleation and maturation and thus CD117 expression gradually decreases.

The term "CD71" as used herein, also known as "transferrin receptor 1," refers to a transmembrane glycoprotein, composed of two disulfide-linked monomers linked by two disulfide bonds. Each monomer binds to a holo transferrin molecule to produce an iron-transferrin-transferrin receptor complex, which enters a cell through endocytosis for the production of hemoglobin during the development of the cell into erythroid line. CD71 is not expressed under SFEM conditions, indicating that Lin$^-$ cells do not use transferrin during the culture phase in SFEM and the cells do not enter erythroid line to begin to take up iron to synthesize hemoglobin. After the cells are cultured in the first stage differentiation medium, the cells enter erythroid differentiation and need to take up a large amount of transferrin, and thus CD71 expression increases rapidly to meet the uptake of cellular transferrin. After the cells are cultured in the second stage differentiation medium, erythroid cells have synthesized enough hemoglobin and thus CD71 expression gradually decreases and red blood cells mature.

The term "Hoechst33342" as used herein refers to a fluorescent dye used to stain DNA. The dye can pass through cell membrane and bind to DNA. If the cell is not denucleated, the binding between the dye and DNA can be detected by flow cytometry with a positive signal. If the cell is denucleated, a negative signal will be detected by flow cytometry.

In view that CD235a is a surface marker of red blood cells, the co-expression of both CD235a and Hoechst33342 signal can be detected by flow cytometry at the same time. CD235a-positive Hoechst 33342-positive indicates erythroid non-enucleated cells, and CD235a-positive Hoechst 33342-negative indicates mature red blood cells. In the SFEM and first stage differentiation media, cells entered into erythroid differentiation from Lin$^-$ cells with CD235a expression increasing, but the cells do not enucleate, and thus the cells are Hoechst 33342 positive. When the cells enter the second stage differentiation medium, the cells begin to mature and enucleate, and Hoechst 33342 negative cells appear, indicating that the red blood cells are mature. The present invention also allows to identify the morphology, structure and function of mature red blood cells.

In the present disclosure, Lin$^-$ CD34$^-$ cells present in a small amount in peripheral blood are used to prepare mature red blood cells, in which Lin$^+$ cells in PBMCs are removed at the very early stage of the method, namely before the expansion or enrichment of Lin$^-$ CD34$^-$ cells. Without being intended to be limited by theory, it is believed that the early removal of Lin+ cells from PBMCs has been found to be beneficial for the expansion, proliferation and/or differentiation of erythroid cells. The rate of proliferation of red blood cells is very high, and the method of the present disclosure can achieve about 1000-fold or more proliferation and differentiation in about 22 days, which provides possibilities for future clinical applications.

In addition, the innovative use of Lin$^-$ CD34$^-$ cells from peripheral blood for hematopoiesis in vitro can avoid the injuries to donors caused by bone marrow cell mobilization by drug intervention or bone marrow puncture in a traditional CD34$^+$ hematopoietic method. Further, since umbilical cord blood-derived CD34$^+$ cells can only be collected at birth, the method of the present disclosure exhibits a significant advance since it can use peripheral blood for hematopoiesis at any time.

It will be appreciated by those skilled in the art that other variations of the embodiments described herein may also be practiced without departing from the scope of the invention. Other modifications are therefore possible.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

EXAMPLES

In the Examples, if specific conditions are not indicated, conventional conditions or the conditions recommended by manufacturers are used. Reagents or instruments without a manufacturer information are commercially available.

Example 1

I. Material Preparation

1.1 Biotinylated Antibodies

The following components are required to formulate 1 ml of biotin-labeled antibodies:

| Antibody | Volume |
| --- | --- |
| Biotinylated mouse anti-human CD3 antibody | 20 ul |
| Biotinylated mouse anti-human CD14 antibody | 20 ul |
| Biotinylated mouse anti-human CD16 antibody | 20 ul |
| Biotinylated mouse anti-human CD19 antibody | 20 ul |
| Biotinylated mouse anti-human CD41a antibody | 20 ul |
| Biotinylated mouse anti-human CD56 antibody | 20 ul |
| Biotinylated mouse anti-human CD235a antibody | 20 ul |

1.2 Cell Expansion Medium (Comprising Cytokine Combination and Penicillin in a Hematopoietic Stem Cell Expansion Medium)

The following components are required to formulate 1 L of cell expansion medium:

| Components | Storage solution concentration | Final concentration | Volume |
| --- | --- | --- | --- |
| StemSpan serum-free medium (STEMCELL Technologies) | 1× | 1× | 1 L |
| Recombinant human fms-like tyrosine kinase 3 ligand (rhFlt3L) | 200 mM | 2 mM | 10 ml |
| Recombinant human stem cell factor (rhSCF) | 100 µg/ml | 100 ng/ml | 1 ml |
| Recombinant human interleukin 3 (rhIL-3) | 100 µg/ml | 100 ng/ml | 1 ml |
| Recombinant human interleukin 6 (rhIL-6) | 800 µg/ml | 800 pg/ml | 1 ul |

1.3 the Formulation of the First Stage Differentiation Medium

The following components are required to formulate 1 L of the first stage differentiation medium:

| Components | Final concentration | Volume |
| --- | --- | --- |
| IMDM | 85% | 850 ml |
| Fetal Bovine Serum (FBS, Gibco) | 10% | 100 ml |
| Human Plasma | 5% | 50 ml |
| Glutamine | 2 nM | 10 ml |
| Bovine serum albumin | 2% | 20 ml |
| Human transferrin | 500 µg/ml | 100 µl |
| Recombinant human insulin | 10 µg/ml | 100 µl |
| Penicillin-Streptomycin | 2% | 20 ml |
| Recombinant human interleukin 3 | 100 ng/ml | 1 ml |
| Recombinant human erythropoietin | 100 ng/m | 1 ml |
| Recombinant human stem cell factor | 100 ng/ml | 1 ml |

1.4 the Formulation of the Second Stage Differentiation Medium

The following components are required to formulate 1 L of the second stage differentiation medium:

| Components | Final concentration | Volume |
| --- | --- | --- |
| IMDM | 85% | 850 ml |
| Fetal Bovine Serum (FBS, Gibco) | 10% | 100 ml |
| Human Plasma | 5% | 50 ml |
| Glutamine | 2 mM | 10 ml |
| Bovine serum albumin | 2% | 20 ml |
| Human transferrin | 500 µg/ml | 100 µl |
| Recombinant human insulin | 10 µg/ml | 100 µl |
| Penicillin-Streptomycin | 2% | 20 ml |
| Recombinant human erythropoietin | 2 U/ml | 20 ul |

II. Isolation of Peripheral Blood Mononuclear Cells

Whole blood was taken and diluted with phosphate buffered saline at a rate of 1:1. The diluted blood was centrifuged by use of a lymphocyte separation solution (Lymphoprep™, STEMCELL Technologies) and a lymphocyte separation tube, at 1200×g for 15 minutes, and mononuclear cells were drawn with a capillary tube.

III. Collection of Lin⁻ CD34⁻ Cells in Peripheral Blood

After centrifuging the peripheral blood mononuclear cells obtained in step II at 300×g for 10 minutes, the cells were resuspended at $1\times10^6$ cells/ml in a cell isolation buffer added with 2% bovine serum albumin and 1 mM EDTA in a phosphate buffer solution, to obtain a cell suspension.

The biotin-labeled antibodies were diluted with the cell isolation buffer at a volume 10 times that of the cell suspension, 20-40 µg/ml of the biotin-labeled antibodies were added to the cell suspension, 300 µl of streptavidin-labeled magnetic beads were added, and then the mixture was incubated at 4° C. for 30 minutes. Then the mixture was placed in a magnetic rack for 6-8 minutes to perform lineage cell separation, and the isolation buffer that was not adsorbed was collected and centrifuged at 300×g for 10 minutes to obtain Lin⁻ CD34⁻ cells.

IV. Preparation of Mature Red Blood Cells

On Day 0, $0.1\text{-}0.5\times10^5$ Lin⁻ CD34⁻ cells were seeded into a hematopoietic stem cell expansion medium, and a combination of cytokines and penicillin-streptomycin were added. In the medium, the cytokine combination and penicillin-streptomycin constitute the cell expansion medium. The components of the cell expansion medium are as described above. The cells were cultured to Day 4, which stage is defined as the expansion stage of Lin⁻ CD34⁻ cell. On Day 5, the culture system was changed by changing the medium to the first stage differentiation medium with a composition as described above. The cells were cultured at 37° C., 5% $CO_2$ until Day 13, which stage is defined as the differentiation stage of Lin⁻ CD34⁻ cells. On Day 14, the culture system was changed by changing the medium to the second stage differentiation medium with a composition as described above, and the cells were cultured at 37° C., 5% $CO_2$ until Day 22, which stage is defined as the enucleation and maturation stage of red blood cells. During Days 0-22, the corresponding stage media were changed every 2-4 days.

V. Cell Expansion Number Analysis

The number of cells was measured on Days 0-22, and the cells in the culture system were fully resuspended every 3-4 days. 10 µl of the cell suspension was taken and mixed with 10 µl of trypan blue staining solution, and counted by a cell counter.

Specifically, the cell proliferation is as follows, with the starting cell number being normalized to $1\times10^6$:

| Days | 0 | 4 | 7 | 11 | 13 | 17 | 19 | 22 |
| --- | --- | --- | --- | --- | --- | --- | --- | --- |
| Donor 1 | 1 | 2.69 | 21.53 | 89.20 | 209.17 | 738.24 | 996.62 | 1011.38 |

-continued

| Days | 0 | 4 | 7 | 11 | 13 | 17 | 19 | 22 |
|---|---|---|---|---|---|---|---|---|
| Donor 2 | 1 | 2.33 | 13.84 | 36.91 | 126.73 | 406.03 | 501.92 | 517.22 |

The cell proliferation curve was drawn from the number of cells obtained, as shown in FIG. 1. It can be seen that under this culture condition, erythrocytes can normally proliferate and differentiate, and can achieve 1000-fold or even more proliferation.

VI. Cell Phenotype Analysis

Cells at the expansion, differentiation and enucleation/maturation stages of Lin$^-$ CD34$^-$ were respectively analyzed according to the below specific procedures.

The cells in the culture system were sufficiently resuspended, 50-100 µl of cell suspension were taken and added to 500 µl of phosphate buffer solution. 0.5 µl of mouse anti-human CD235a-APC antibody, 2 µl of mouse anti-human CD71-PerCP Cy5.5 antibody, 2 µl of mouse anti-human CD117-PE Cy7 antibody and 0.5 µl of Hoechst 33342 dye were added, mixed thoroughly and incubated in dark for 20 minutes. The mix was tested on a flow cytometer. The specific surface marker expression levels of target cells were analyzed. A change curve was plotted through analysis at different time points, obtaining the schematic diagrams as shown in FIGS. 2 to 10.

VII. Analysis of Erythrocyte Enucleation

Figure 11:
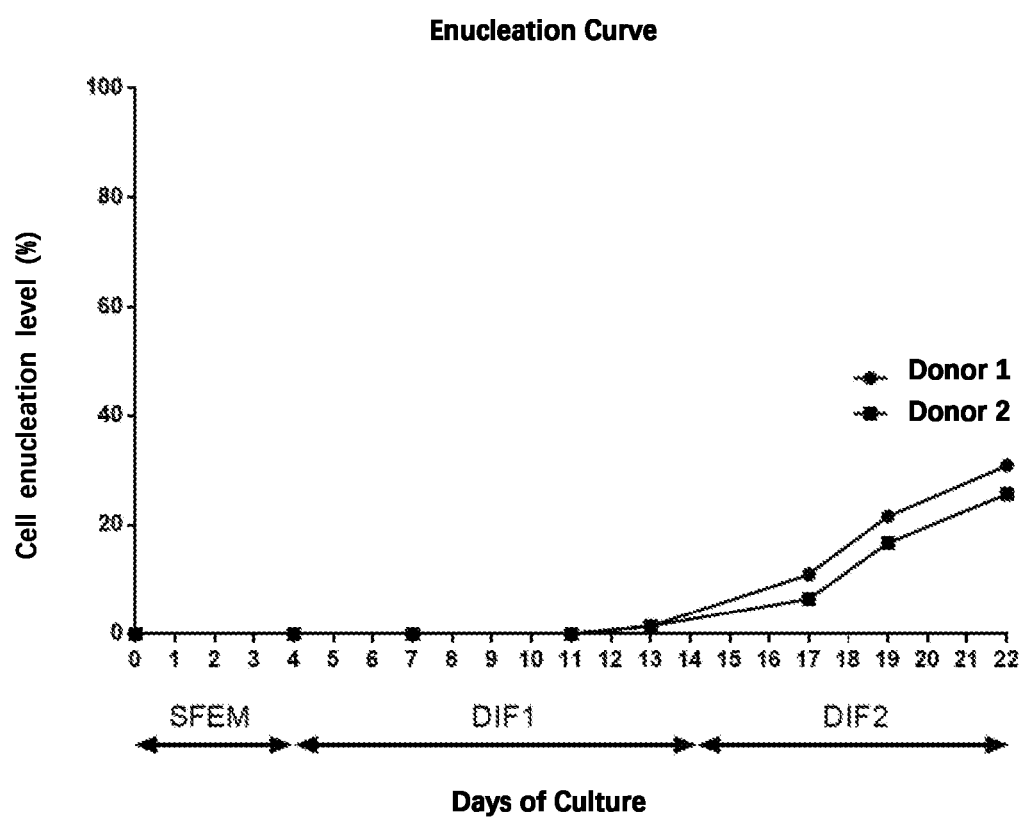
FIG. 11 shows the enucleation during the preparation process.

The proportion of CD235a-positive/Hoechst 33342-negative cells was analyzed by flow cytometry, which can reflect the enucleation of cells. The schematic diagram shown in FIG. 11 was obtained, and it can be seen from the figure that the enucleation level of the cells increased significantly from Day 13.

VIII. Cell Morphology Analysis 0.5-1×10$^6$ cells were taken and a centrifugal smear was performed using a blood cell centrifugal smear machine. The smear was fixed with −20° C. pre-cooled methanol at room temperature for 2 minutes. The fixed blood smear was washed 3 times with water for 5 minutes each time, and air-dried at room temperature. p-diaminobiphenyl tablets (Benzidine, Sigma) was dissolved with 10 ml of phosphate buffer solution, 10 µl of hydrogen peroxide solution was added, and then the solution was filtered. 300-500 µl of the filtered solution was used to stain the blood smears at room temperature for 1 hour. The stained blood smears were washed 3 times for 5 minutes each time, and air-dried at room temperature. Secondary staining of the blood smear was made by Giemsa stain at room temperature for 35-40 minutes. The stained blood smears were washed 3 times for 5 minutes each time, and air-dried at room temperature. The slides were sealed with a sealing agent and observed under a microscope with pictures being taken.

Figure 12:
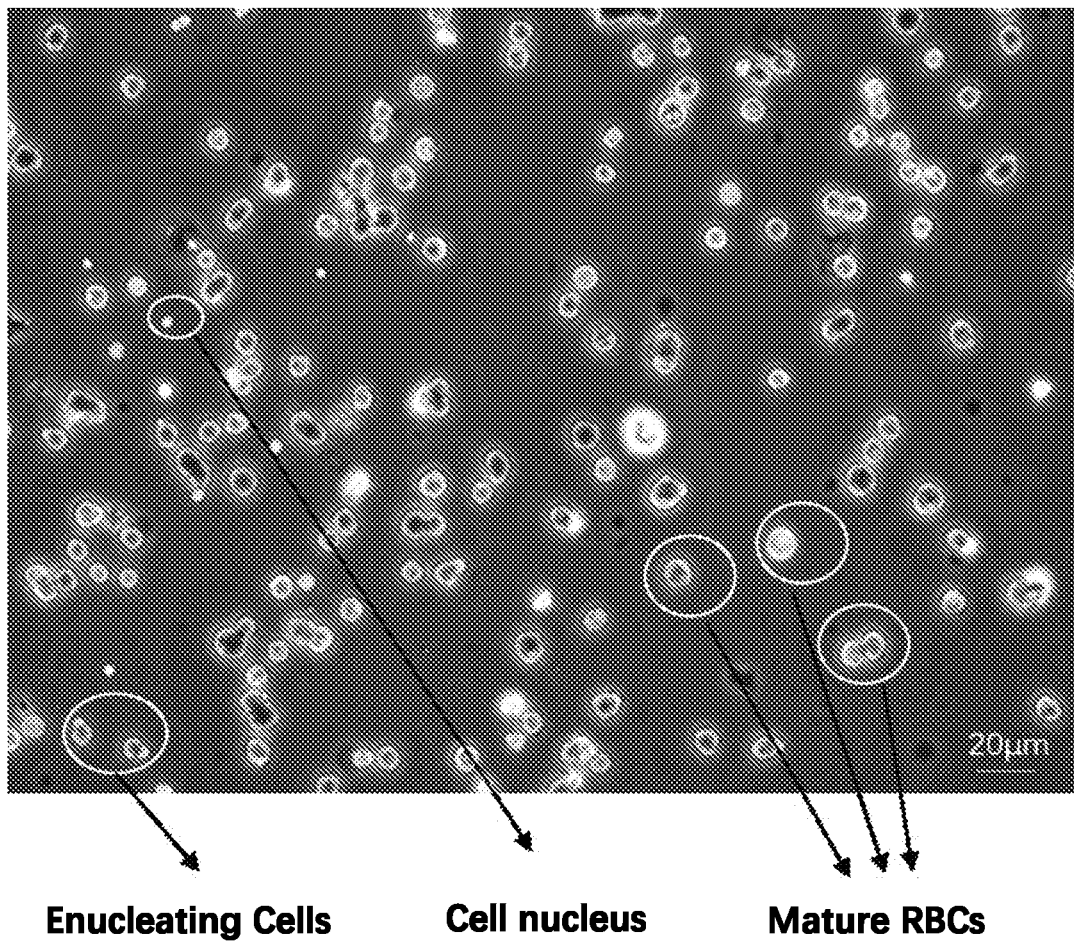
FIGS. 12 and 13 show the morphology of RBCs detected under a microscope upon smear staining of the cells after the completion of cell differentiation.
Figure 13:
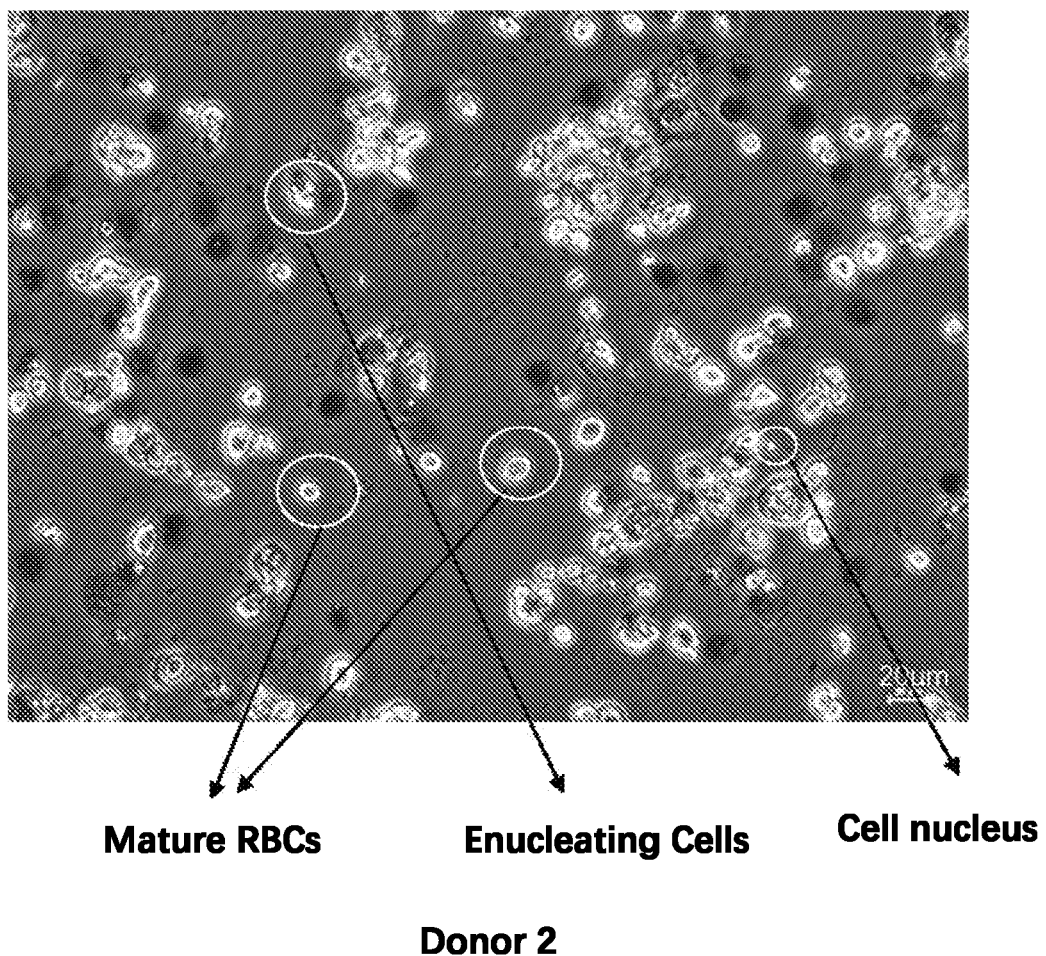

The schematic diagram shown in FIG. 12 was obtained. It can be seen from the figure that after the cell differentiation was completed on Day 22, mature red blood cells apparently appeared.

Example 2

This Example was performed by uses the below formulations, which are similar to the expansion and differentiation media as used in Example 1.

2.1 Biotinylated Antibodies

| Antibody | Final concentration |
|---|---|
| Biotinylated mouse anti-human CD3 antibody | 4 µg/ml |
| Biotinylated mouse anti-human CD14 antibody | 4 µg/ml |
| Biotinylated mouse anti-human CD16 antibody | 4 µg/ml |
| Biotinylated mouse anti-human CD19 antibody | 4 µg/ml |
| Biotinylated mouse anti-human CD41a antibody | 4 µg/ml |
| Biotinylated mouse anti-human CD56 antibody | 4 µg/ml |
| Biotinylated mouse anti-human CD235a antibody | 4 µg/ml |

2.2 Cell Expansion Medium

| Components | Final concentration |
|---|---|
| StemSpan serum-free medium (STEMCELL Technologies) | 1× |
| Recombinant human fms-like tyrosine kinase 3 ligand (rhFlt3L) | 20 ng/ml |
| Recombinant human stem cell factor (rhSCF) | 100 ng/ml |
| Recombinant human interleukin 3 (rhIL-3) | 5 ng/ml |
| Recombinant human interleukin 6 (rhIL-6) | 10 ng/ml |

2.3 the First Stage Differentiation Medium

| Components | Final concentration |
|---|---|
| IMDM | 85% (v/v) |
| Fetal Bovine Serum (FBS, Gibco) | 10% (v/v) |
| Human Plasma | 5% (v/v) |
| Glutamine | 2 mM |
| Bovine serum albumin | 10 mg/ml |
| Human transferrin | 500 µg/ml |
| Recombinant human insulin | 10 µg/ml |
| Penicillin | 100 U/ml |
| Streptomycin | 100 µg/ml |
| Recombinant human interleukin 3 | 5 ng/ml |
| Recombinant human erythropoietin | 6 U/ml |
| Recombinant human stem cell factor | 100 ng/ml |

2.4 the Second Stage Differentiation Medium

| Components | Final concentration |
|---|---|
| IMDM | 85% (v/v) |
| Fetal Bovine Serum (FBS, Gibco) | 10% (v/v) |
| Human Plasma | 5% (v/v) |
| Glutamine | 2 mM |
| Bovine serum albumin | 10 mg/ml |
| Human transferrin | 500 µg/ml |
| Recombinant human insulin | 10 µg/ml |
| Penicillin | 100 U/ml |
| Streptomycin | 100 µg/ml |
| Recombinant human erythropoietin | 2 U/ml |

Same procedures and analysis similar to II-VIII of Example 1 are made and similar results were obtained (data not shown).

Although preferred embodiments of the invention have been described herein, it will be understood by those skilled in the art that variations may be made thereto without departing from the spirit of the invention or the scope of the appended claims. All documents disclosed herein, including those in the following reference list, are incorporated by reference.

What is claimed is:

1. A method for producing red blood cells (RBCs), comprising:
   (a) collecting lineage and CD34 negative cells (Lin⁻CD34⁻ cells) from a peripheral blood sample,
   (b) expanding the Lin⁻CD34⁻ cells; and
   (c) inducing the expanded Lin⁻CD34⁻ cells to differentiate into mature red blood cells, wherein step (b) comprises culturing the Lin⁻CD34⁻ cells in a hematopoietic stem cell expansion medium supplemented with a combination of cytokines, and wherein the combination of cytokines comprises fms-like tyrosine kinase 3 ligand (Flt3L), stem cell factor (SCF), interleukin 3 (IL-3), and interleukin 6 (IL-6),
   wherein step (c) comprises:
   (c1) in a first differentiation medium supplemented with cytokines related to erythroid development, culturing the expanded Lin⁺CD34⁻ cells to induce the same to differentiate into erythroid cells, wherein the cytokines related to erythroid development include IL-3 and SCF, wherein the first differentiation medium is an Iscove's Modified Dulbecco's Medium (IMDM) containing about 5-15% (v/v) FBS, about 2-10% (v/v) human plasma, about 1-4 mM glutamine, about 5-15 mg/ml BSA, about 300-600 µg/mL human transferrin, about 8-13 µg/mL human insulin, 1-3% Penicillin-Streptomycin, about 3-7 ng/ml human IL-3, about 4-7 U/mL human EPO, and about 80-120 ng/mL human SCF; and
   (c2) culturing the erythroid cells in a second differentiation medium to induce enucleation, wherein the second differentiation medium lacks the cytokines related to erythroid development as compared to the first differentiation medium, wherein the second differentiation medium is an Iscove's Modified Dulbecco's Medium (IMDM) containing about 5-15% FBS, about 2-10% human plasma, about 1-4 mM glutamine, about 5-15 mg/ml BSA, about 300-600 µg/mL human transferrin, about 8-13 µg/mL human insulin, an effective amount of one or more antibiotics, and about 1-5 U/mL human EPO.

2. The method of claim 1, wherein the blood sample is a human peripheral blood sample.

3. The method of claim 1, wherein step (a) comprises isolating peripheral blood mononuclear cells (PBMCs) from the blood sample and removing lineage positive (Lin⁺) cells from the PBMCs.

4. The method of claim 3, wherein step (a) further comprises removing CD34 positive (CD34⁺) cells from the PBMCs.

5. The method of claim 1, wherein the combination of cytokines comprises about 10-100 ng/mL human Flt3L, about 50-150 ng/ml human SCF, about 1-10 ng/mL human IL-3, and about 5-20 ng/ml human IL-6.

6. The method of claim 1, wherein the hematopoietic stem cell expansion medium is a serum-free expansion medium.

7. The method of claim 1, wherein step (b) comprises culturing the Lin⁻CD34⁻ cells at 37° C. under 5% $CO_2$ for about 2-5 days.

8. The method of claim 1, wherein step (c1) comprises culturing the expanded Lin⁻CD34⁻ cells at 37° C. under 5% $CO_2$ for about 9-11 days.

9. The method of claim 1, wherein the antibiotics is Penicillin-Streptomycin.

10. The method of claim 1, wherein step (c2) comprises culturing the erythroid cells at 37° C. under 5% $CO_2$ for about 7-9 days.

* * * * *